C. SAUNDERS.
HOOK.
APPLICATION FILED MAR. 27, 1906.
921,286.
Patented May 11, 1909.
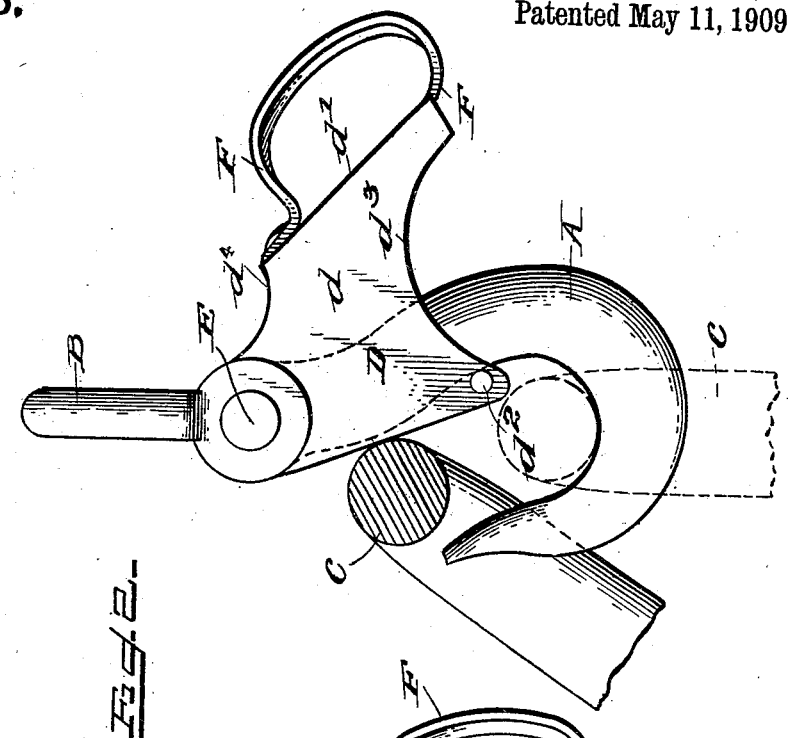
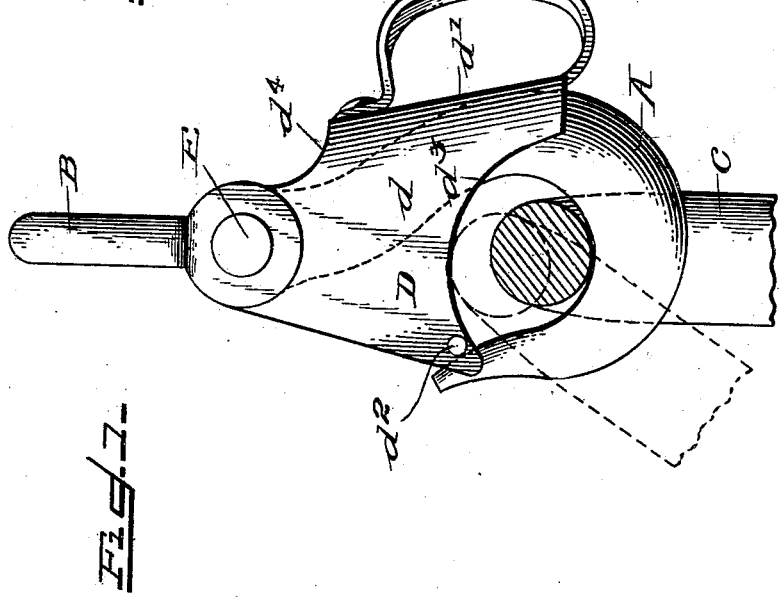

UNITED STATES PATENT OFFICE.

CHARLES SAUNDERS, OF PHILADELPHIA, PENNSYLVANIA, ASSIGNOR TO LIDGERWOOD MANUFACTURING COMPANY, A CORPORATION OF NEW YORK.

HOOK.

No. 921,286.　　　　Specification of Letters Patent.　　　Patented May 11, 1909.

Application filed March 27, 1906. Serial No. 308,242.

*To all whom it may concern:*

Be it known that I, CHARLES SAUNDERS, a citizen of the United States, and a resident of Philadelphia, in the county of Philadelphia and State of Pennsylvania, have invented certain novel and useful Improvements in Hooks, of which the following is a specification.

My present invention relates to certain novel and useful improvements in hooks and has particular application to a hook adapted especially for use in connection with hoisting and conveying apparatus. In the present instance, it is my intention to provide a hook designed to receive the bail of a tub, bucket or other receptacle, and to lock the same in such manner that it will be impossible for the bail to become dislodged during the conveying operation or when subjected to such shocks and jars as are usually experienced in the hoisting and conveying of heavy loads.

To the accomplishment of this end and others of a similar nature, my invention consists in the construction, combination and arrangement of parts set forth in and falling within the scope of the appended claims.

In the accompanying drawings I have by way of illustration delineated one embodiment of my invention.

Figure 1 is a view in side elevation showing a hook embodying my improvements, the retaining shroud or shield being shown in its locked position; Fig. 2 is also a view in side elevation with the shroud or shield in open position to permit the release of the bail of the bucket.

Referring now to the accompanying drawings in detail, A indicates the body portion of the hook which may be of any suitable and desired construction, and in the present instance I have shown the hook of the shape and character commonly adapted for use in carrying heavy tubs, buckets or the like, generally used by contractors. This hook is provided with the usual eye B for connecting the device with a chain, rope or similar hoisting and suspending means.

C designates the bail or handle for a bucket, tub or similar receptacle. In order to lock the bail in such a position on the hook as to prevent its dislodgment during the hoisting and conveying operation, I provide a novel retaining shield or shroud, indicated as a whole by the letter D. This shroud is preferably constructed of a single piece of sheet metal or other suitable material provided with the relatively wide side members $d$ and the curved back piece $d'$ adapted to fit snugly over the back of the hook and formed integrally with and connecting the sides.

As will be seen from the drawings, these side faces project forward across the opening of the hook, or that portion receiving the bail of the bucket, so that when the shroud is in its closed position, as is shown in Fig. 1, said side members reach to the point of the hook and extend across the bail of the bucket held by such hook. The shroud is pivotally connected to the hook by the pintle E, which also connects the eye member B to the hook proper.

$d^2$ designates a cross pin connecting the two side members of the shroud D; as is seen by reference to Fig. 1 when the shroud is brought forward into a position to prevent the release of bail C the end of the hook adjacent the point passes between the sides of the shroud and rests against the pin $d^2$; the sides of the shroud being held a fixed distance apart by the pin, the end of the hook cannot force them a farther distance apart and it is thus seen that the end of the hook is securely positioned between the sides of the shroud. The pin $d^2$ also prevents a full backward and upward swing of the shroud when the hook is opened as shown in Fig. 2.

The normal locking position of the device is shown in Fig. 1. But when it is desired to release the bail from the hook, the shroud or shield may be pulled back to the position shown in Fig. 2 through the medium of the hand grip F secured to the back of the shield or shroud and the bail and the bucket may be removed in the ordinary manner. The lower edge portions of the shroud are cut away as shown at $d^3$ to accommodate the contour of the bail, while the upper back portion of the shroud is also preferably cut away, as shown at $d^4$, to permit the free and unhampered movement of the shroud upon its pivot.

It will be noted that I have provided an exceedingly simple yet effective means for locking the bail in the hook and one which will be found especially useful where the tubs or buckets handled are of such size and character as to require care in hoisting and conveying the same.

Having thus described my invention, what

I claim and desire to secure by Letters Patent is:

1. A device of the class described, comprising a hook, a shield or shroud pivoted thereto surrounding the upper portion of the hook, and comprising side members, and a pin connecting the side members, the end of the hook being adapted to be positioned between the side members when the shroud is in position to close the hook.

2. A device of the class described, comprising a hook and a shroud or shield therefor formed of an integral piece of material and having parallel side members and a curved back portion adapted to rest over the back of the hook, and a pin connecting the sides of the shroud or shield at their forward parts.

3. A device of the class described comprising a hook member, a shroud or shield inclosing the upper portion thereof and pivotally connected to the hook member, a pin extending through the forward portion of the shroud or shield and a handle secured to the back of said shroud or shield.

4. The combination with a hook, of a shroud or shield pivoted thereto and formed with a back portion adapted to fit over the outer surface of the back of the hook, and with forwardly extending side faces projecting across the opening of the hook.

In witness whereof, I have hereunto set my hand this 22nd day of March, A. D. 1906.

CHARLES SAUNDERS.

In the presence of—
F. ED STUTZ,
DE WITT W. SMITH.